W. M. PICKARD.
HAY PRESS.
APPLICATION FILED JUNE 1, 1908.
920,992.
Patented May 11, 1909.
2 SHEETS—SHEET 1.
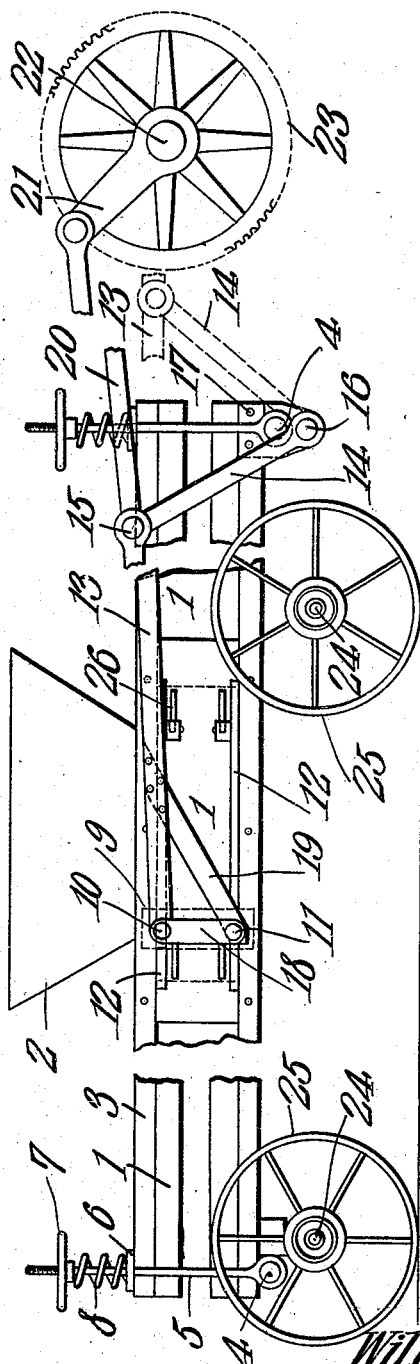
Witnesses
E. W. Stewart
F. T. Chapman
Inventor
William M. Pickard.
By C. A. Snow & Co.
Attorneys

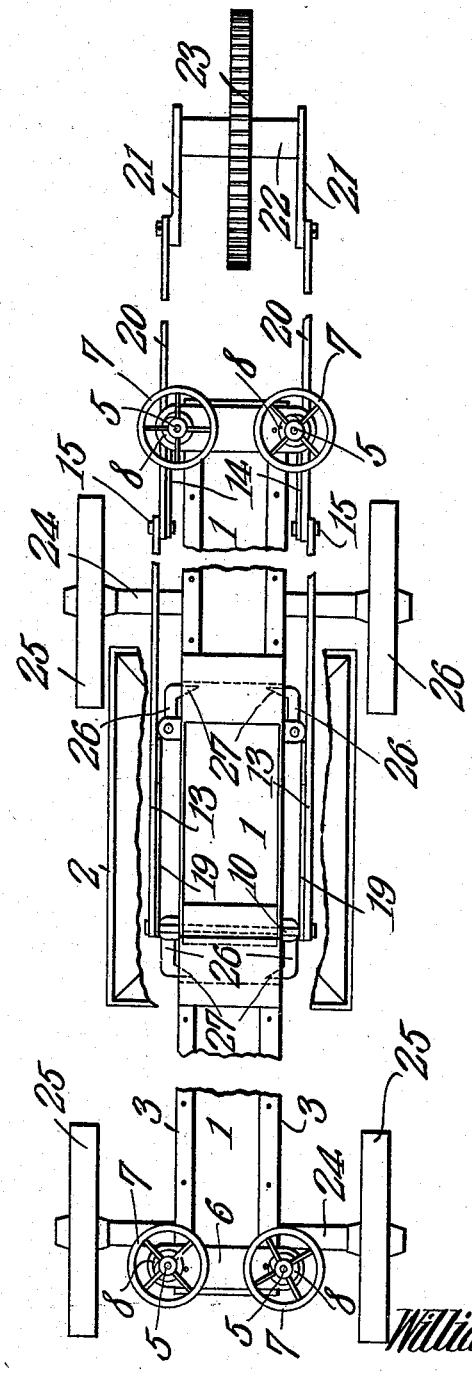

UNITED STATES PATENT OFFICE.

WILLIAM MOAD PICKARD, OF WEATHERFORD, TEXAS.

HAY-PRESS.

No. 920,992.　　　　Specification of Letters Patent.　　　　Patented May 11, 1909.

Application filed June 1, 1908. Serial No. 436,118.

*To all whom it may concern:*

Be it known that I, WILLIAM MOAD PICKARD, a citizen of the United States, residing at Weatherford, in the county of Parker and State of Texas, have invented a new and useful Hay-Press, of which the following is a specification.

This invention has reference to improvements in hay presses and its object is to produce a press wherein both strokes of a reciprocating plunger become power strokes, and compressed hay is forced out of each end of the press, the press thus becoming a duplex press.

The invention also contemplates the use of a toggle lever construction wherein toward the completion of each stroke of the plunger the toggle becomes active to greatly increase the power of the stroke.

The invention will be best understood from a consideration of the following detailed description taken in connection with the accompanying drawings, forming a part of this specification, in which drawings—

Figure 1 is a side elevation of the improved baling press with parts broken away and some parts omitted, and, Fig. 2 is a plan view of the same with parts broken away and some parts omitted.

Referring to the drawings, there is shown a baling chamber 1 which is entered through a suitable hopper 2 in the usual manner. In connection with the hopper there will, of course, in the practical embodiment of the invention, be used suitable mechanism for introducing the hay into the baling chamber, but as such mechanism forms no part of the present invention it has been omitted from the drawings.

The baling chamber is made of suitable corner beams 3 which extend to both ends of the structure, and suitable bottom and side members are provided as is usual in baling presses, and beyond that portion of the baling chamber coincident with the hopper, suitable top members are provided as is common.

In each end of the baling chamber beneath the same, is a cross bar 4 extending beyond the sides of the ends of the baling chamber and there supporting links 5, which extend up above the top of the baling chamber and pass through a cross plate 6 resting on top of the ends of the baling chamber. The upper end of each link is threaded for the reception of an adjusting hand wheel 7 between which and the plate 6, the link is surrounded by a suitable spring 8. There is thus provided at each end of the baling chamber an adjustable clamping member comprising the cross bars 4, the cross plate 6, the two links 5, the hand wheel 7 and the springs 8, so that the ends of the baling chamber may be contracted as much as may be desired for the proper compacting of the hay, while at the same time choking is prevented by the yielding of the springs 8, which latter should be of such strength as to yield only to excessive pressures, so that the hay may receive a certain predetermined compression without, however, subjecting the baling chamber to undue strain, and without subjecting the operating mechanism to strains which might become destructive.

Within the receiving portion of the baling chamber coincident with the hopper 2 is a plunger 9 capable of traversing the full length of the receiving portion of the baling chamber. Extending laterally through the plunger 9 near each end thereof are two cross rods 10 and 11. These rods 10 and 11 also extend at each end through suitable slots 12 through the side walls of the baling chamber within the range of movement of the plunger 9 and near the top and bottom of said chamber, these slots extending longitudinally of said baling chamber.

On opposite sides of the baling chamber are links 13 connected at one end to the rod 10, and connected at the other end to a link 14 by means of a pivot pin 15. Each link 14 is connected at the end remote from its connection with the link 13 by a pivot pin 16 to a bracket 17, fastened on the corresponding end of the baling chamber, and in the particular instance shown in the drawings each bracket 17 is connected to the lower portion of the baling chamber at the corresponding end. Each rod 10 and 11 at the outer ends receive the ends of a connecting strap 18 which serves to space and support these outer ends of the rods 10 and 11, and from the rod 11 to the link 13 there extends a diagonal brace strap 19, so that the plunger 9 is always held in a substantially upright position. This permits the connection of the link 13 to either the upper or lower end of the plunger 9 by the rods 10 and 11 as the case may be. In the drawings the link 13 is connected directly to the upper rod 10.

Connected to the links 13 and 14 by the pivot pin 15, is a pitman 20, there being one pitman for each link 13, and these two pitmen are connected respectively to cranks 21 on a common shaft 22, which latter though not so shown is assumed to be in fixed relation to the timbers of the baling chamber. For instance, the journals on the shaft 22 may be mounted upon continuations of the corner beams 3 of the baling chamber or any other arrangement whereby the fixed relation of the shaft 22 to the baling chamber may be maintained is within the scope of the present invention. Fast on the shaft 22 is a gear wheel 23, or if desired this gear wheel may be replaced by a belt pulley of proper size, and in the practical embodiment of the invention the gear wheel or belt pulley receives power from any suitable type of explosive engine.

The baling chamber is mounted upon suitable axles 24 and wheels 25 for transportation from place to place. At each end of the receiving portion of the baling chamber, beyond the limit of travel of the plunger 9 are suitable dogs 26 pivoted at one end to the exterior of the side walls of the baling chamber, and at the other end each dog is formed into a tooth 27, entering the baling chamber and acting to retain the hay and prevent its return into the receiving portion of the baling chamber after having been once forced toward the delivery ends of the baling chamber.

Suppose that the plunger 9 is at one end of its travel and that hay is introduced through the hopper 2 into the receiving portion of the baling chamber 1. If now the shaft 22 be rotated by power applied to the wheel 23, as for instance by a gasolene engine, then the plunger will be drawn toward the other end of the baling chamber and the hay will be held by the dogs 26 in the discharge end of the baling chamber. On the return movement of the plunger, hay having already been introduced through the hopper 2 into the receiving end of the baling chamber, the hay will be held by the other set of dogs in the other end of the discharge portion of the baling chamber. As the shaft 22 continues to rotate, and hay is introduced in front of the plunger in each direction of its rotation, the hay is forced first toward one discharge end and then toward the other, and these discharge ends being suitably throttled by the clamping means at the discharge end, the hay becomes duly compressed in accordance with the throttling of the discharge ends of the baling chamber. As the throttling means are elastic or yielding, the hay will become compressed up to a certain point and then if the pressure becomes greater than the predetermined pressure, these elastic clamping means will yield to the extraordinary pressure, and the structure will thereby be relieved from undue strain. Any tendency of the compressed hay returning into the receiving portion of the baling chamber is prevented by the dogs 26, as before stated.

It will be observed that since the pivot point 15 is mounted upon the free end of the link 14, which latter turns about the fixed pivot point 16, the travel of the ends of the link connected to the pivot 15, is greater than though the pivot 15 moved through a straight line, although the distance traveled by the plunger 9 is the same in either case. There is therefore a toggle action between the links 13 and the pitman 20, due to the presence of the link 14, and this toggle action takes place toward the end of the power stroke of the plunger 9 in each direction. Thus when the resistance of the hay increases to a greater extent the power of the plunger is increased correspondingly without placing any greater load upon the shaft 22, but the rate of travel of the plunger 9 is correspondingly decreased toward the close of the power stroke of the plunger in each direction.

While the links 13 are shown as connected to the rod 10, it will be understood that they may if desired, be connected to the rod 11, and the links 14 may be reversed so that their pivot points 16 are above the pivot pins 15 instead of below the same as shown in the drawings, this constituting a mere reversal of the parts in position.

It is to be understood that the invention is not confined to the exact arrangement or disposition of the parts shown, since these parts may be otherwise arranged and differently proportioned than illustrated, without in any manner affecting the invention or departing from the principles upon which the invention is based.

What is claimed is:

1. A hay press provided with a baling chamber having longitudinal slots on opposite sides near the top and bottom, a reciprocating plunger within the baling chamber, rods extending from the plunger near the top and bottom thereof and through the slots, operating links directly connected to the ends of the rod at one end of the plunger, connections between the two rods on the plunger and bracing connections from the links to the ends of the other rod on the plunger.

2. A hay-press provided with a baling chamber, a reciprocating plunger therein, rods extending from the plunger near the upper and lower ends thereof, operating links connected to the ends of the rod at one end of the plunger, and bracing connections from the links to the ends of the other rod on the plunger.

In testimony that I claim the foregoing as my own, I have hereto affixed my signature in the presence of two witnesses.

WILLIAM MOAD PICKARD.

Witnesses:
R. B. RIDGWAY,
BERNARD MARTIN.